Figures 1, 2:
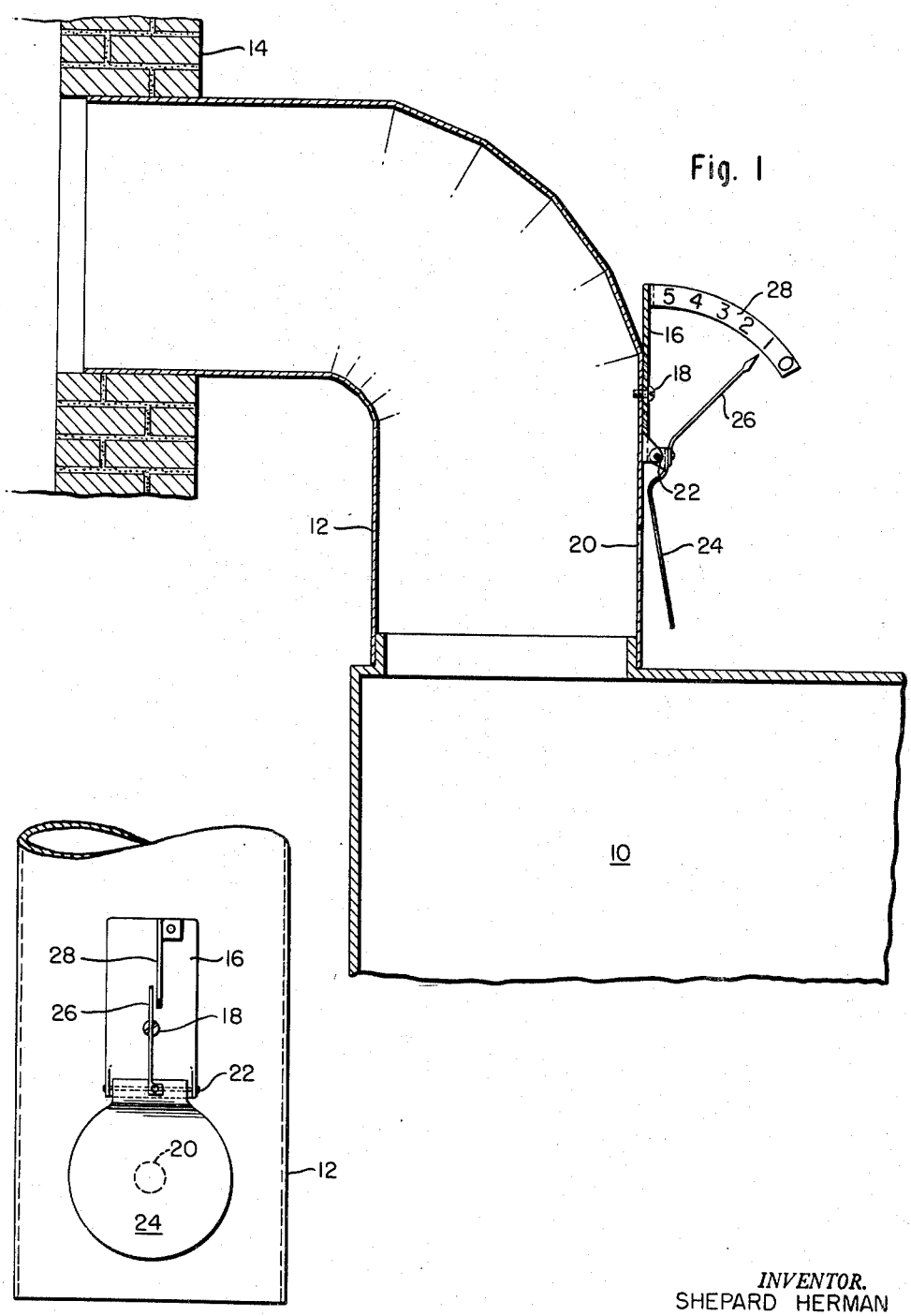

INVENTOR.
SHEPARD HERMAN

United States Patent Office 2,806,377
Patented Sept. 17, 1957

2,806,377

STACK PRESSURE METER

Shepard Herman, Waban, Mass.

Application April 16, 1953, Serial No. 349,176

2 Claims. (Cl. 73—389)

This invention relates to a novel meter for measuring the stack pressures and pulsations of combustion heaters. It is well known that variations in air pressures in the stacks of combustion furnaces result in a condition known as "pulsating." This condition is caused by various factors including lack of proper balance between fuel and air in the combustion chamber, lack of capacity balance between combustion chamber and flue stack and various other mechanical factors. I am aware that numerous attempts have been made to correct this condition, particularly by controlling the amount of air entering some part of the combustion chamber or stack. Also, numerous methods are available for measuring stack pressures, but they are not adapted to measure pulsating conditions and are lacking in features to aid the engineer in correcting pulsating difficulties.

It is quite apparent that "pulsating" occurs only when certain factors of combustion are out of balance and this lack of balance, operating through pressure variations in the stack adjacent to the combustion chamber, causes the pulsating effects. My invention contemplates a relatively simple and inexpensive meter for determining and measuring continuously the pressure conditions within the stack whereby to aid the making of corrections necessary to cure the pulsating effects. The meter is adapted furthermore, to indicate the degree of pulsation or imbalance, and so continuously indicate the stack condition that the results of corrections can be continuously observed as the corrections are being made. The production of a novel meter of the character described for performing these functions to the end of providing perfect balance and combustion comprises the primary object of the invention. These and other features of my invention are more particularly described as follows:

Fig. 1 is a vertical sectional view through a combustion chamber and stack and illustrating my novel meter in operative position in the stack, and Fig. 2 is a front elevation of the meter mounted on the stack.

In the drawing, 10 indicates a combustion chamber having a stack or flue 12 to a chimney 14. My novel stack meter is adapted to be applied to the stack adjacent to the combustion chamber as illustrated in Fig. 1.

The meter comprises a supporting body 16 including a screw 18 for attaching the body to the stack above a hole 20 drilled through the stack wall, the hole being fractionally small relative to the size of the stack. Pivoted to the body at 22 directly above the hole is a flap valve 24 disposed to pivot inwardly to and outwardly from a position covering the hole. The valve carries a pointer 26 having a free end movable over a fixed scale 28 carried by the body 16, the scale being graduated inwardly from zero at its outer end.

Preferably, as illustrated in the drawing, the valve 24 is mounted normally to hang over the hole 20 by gravity substantially parallel with and closely adjacent to the outer face of the stack wall. The valve 24, pointer 26 and scale 28 are preferably so relatively disposed that normally the valve is disposed adjacent to but spaced outwardly of the hole 20 as illustrated in Fig. 1 and the pointer registers with the numeral "1" on the scale. The operation of the meter as thus employed is substantially as follows:

If the pressure in the stack is substantially equal to the outside atmosphere pressure, the valve and pointer will remain at the normal position, thus indicating the balanced inside and outside pressures. If the outside pressure is greater than the inside pressure, the valve will be closed over the hole and the pointer moved to zero. If the inside pressure is greater than the outside pressure, air or gas exiting through the hole 20 will pivot the valve outwardly and the extent of outward movement of the valve will be registered on the scale.

Under normal and proper operating conditions, the pressure inside the stack will be less than the outside pressure and such a condition is indicated when the pointer is moved to the zero index. If the pointer remains at "1" or moves further to the left on the scale, adjustment must be made to reduce the inside pressure. During such adjustments the meter continues to indicate the stack condition, thus informing the engineer of the results of his adjustments. Also, where a pulsating pressure prevails in the stack, the meter indicates the minimum and maximum pressure variations causing the pulsations and thus aids in making the proper corrections. Any changes made in the adjustment of the relationship of the fuel and air in the combustion chamber are immediately shown on the meter and indicate whether the engineer is making the change in the right direction. If the pointer pulsations decrease as adjustments are being made, the engineer knows that he is on the right track and he will continue in the same direction and finally reach a setting that shows no pulsation and the proper zero reading.

It is particularly noted that my novel stack meter functions as a combined result of conditions inside the stack together with the air pressure in the boiler room, whereas, prevailing types of stack pressure instruments now in use are designed to take their reading solely from the inside of the stack. Improper combustion may take place because the oil burner consumes the supply of air in the boiler room to a reduced pressure which in turn affects the stack draft. Such condition cannot be determined and measured by inside stack pressure instruments but, since my meter functions from the combined inside and outside pressure conditions, it is adapted to aid in correcting situations of this nature. Greater than atmospheric pressure within the stack is the usual cause of objectionable stack conditions, including pulsating, and it is particularly noted that my novel meter is adapted to register such pressures and aid in correcting the abnormal conditions. If the stack has the required draft, less than the outside air pressure, my meter indicates that fact and if the stack has greater than outside air pressure the meter indicates the degree of such pressure and continues to indicate the same during the correcting procedure.

It will be apparent that my novel meter is relatively simple in construction and operation and so inexpensive that it can be employed as not only a portable instrument for the purpose described but also as a permanent fixture on combustion stacks.

Having thus disclosed my invention what I claim as new and desire to secure by Letters Patent is:

1. In combination, a combustion heater stack having a relatively small opening through a vertical wall of the stack, a supporting body attached to the stack above the opening, a flap valve pivoted on the body above the opening to move freely about the pivot axis inwardly to and outwardly from a position covering the opening and normally disposed by gravity in a position adjacent to but not closing the opening, and means carried by the body and valve for indicating the pivotal position of the valve.

2. In combination, a combustion heater stack having a relatively small opening through a vertical wall of the stack, a plate-like body having a rear face in surface abutting relation against said wall above the opening, means securing the body to the wall in said relation, a flap valve pivoted to the body above the opening on a horizontal axis disposed transversely of the opening and having a plane downwardly depending portion substantially larger than and disposed over the opening, said portion being movable about said axis inwardly to and outwardly from a position covering the opening and normally disposed by gravity in a position adjacent to but not closing the opening, and means including a graduated arm fixed to and extending outwardly from said body and a cooperating pointer carried by the valve for indicating the pivotal position of the valve.

References Cited in the file of this patent

UNITED STATES PATENTS

| 50,216 | Asmus | Oct. 3, 1865 |
| 1,105,959 | Bruss | Aug. 4, 1914 |
| 2,072,369 | Jenson | Mar. 2, 1937 |

FOREIGN PATENTS

| 313,205 | Italy | Dec. 19, 1933 |